(12) United States Patent
Kumagai et al.

(10) Patent No.: US 6,585,918 B1
(45) Date of Patent: Jul. 1, 2003

(54) PROCESS FOR MODIFYING A UNIFORMITY OF A TIRE

(75) Inventors: Moriyasu Kumagai, Kodaira (JP); Takehiro Kata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/492,853

(22) Filed: Jan. 27, 2000

(30) Foreign Application Priority Data

Jan. 27, 1999 (JP) .......................................... 11-017948
Dec. 14, 1999 (JP) .......................................... 11-353934

(51) Int. Cl.⁷ .......................... B29D 30/06; B29C 71/02
(52) U.S. Cl. ...................... 264/40.1; 264/345; 264/348
(58) Field of Search .............................. 264/315, 326, 264/40.1, 36.14, 234, 237, 345, 348; 425/445

(56) References Cited

U.S. PATENT DOCUMENTS

| 3,838,142 A | 9/1974 | Hochstein |
|---|---|---|
| 3,880,556 A | 4/1975 | Brown et al. |
| 3,926,704 A | 12/1975 | Sharp, Jr. |
| 4,308,747 A | 1/1982 | Reed |
| 5,365,781 A | 11/1994 | Rhyne |
| 5,616,859 A | 4/1997 | Rhyne |

FOREIGN PATENT DOCUMENTS

| EP | 721852 | 7/1996 |
|---|---|---|
| EP | 0 845 374 A2 | 6/1998 |
| GB | 1297408 | 11/1972 |
| JP | T-6-507858 | 9/1994 |

*Primary Examiner*—Mathieu D. Vargot
(74) *Attorney, Agent, or Firm*—Sughrue Mion, PLLC

(57) ABSTRACT

A process for modifying a uniformity of a tire comprising a radial carcass ply of rubberized organic fiber cords is modifications of radial force variation (RFV) and conicity force (COF), which is carried out by dividing RFV- or COF-rejected tire into two portions and applying different thermal hysteresis to these portions under specified conditions.

15 Claims, 15 Drawing Sheets

PROCESS FOR MODIFYING A UNIFORMITY OF A TIRE

BACKGROUND OF THE INVENTION

1. Field of the Invention

This invention relates to a process for the modification of uniformity in tires, particularly pneumatic radial tires having a carcass ply of organic fiber cords, especially small-size tires such as passenger car radial tires, which effectively and advantageously modifies a radial force variation (hereinafter abbreviated as RFV) and a conicity force (hereinafter abbreviated as COF) of the tire as well as tires applying the above process.

2. Description of Related Art

It is well-known that the uniformity of the tire, particularly the radial tire is an important property depending upon the quality of tire performances. Among uniformity properties, RFV has an influence on performances of almost all radial tires, and COF has particularly a remarkable influence on a straight running performance of the passenger car radial tire. Firstly, RFV will be described below.

When the tire is placed on a uniformity testing machine and run thereon under loading at a state of fixing a loaded radius, the load always varies regardless of a large or small variation during one revolution of the tire, and the quantity of such a variation (all amplitude) is called as RFV. In general, the variation of the load measured by the testing machine can be taken out as a waveform that a primary component forms substantially a sine wave and secondary or more components are superposed thereon when the load applied to the tire is represented on the longitudinal axis and the distance during one revolution of the tire is represented on the horizontal axis. An example of RFV is shown in FIG. 15.

In the tire mounted onto a vehicle, RFV is a variation quantity of reactive force in a radial direction from a road surface per one revolution of the tire running under loading. Therefore, RFV of the tire renders a force for adding vibration to the vehicle, so that the tire having a large value of RFV has problems that the ride comfort of the vehicle against vibrations is degraded and in some cases, an uneven wear is created in the tread rubber to considerably damage the steering stability of the vehicle during the high-speed running.

Therefore, it is necessary to control RFV of the tire within a range not creating the above problems. For this end, all of the tires attaching importance to the uniformity property, particularly the radial tires for passenger cars after the building through vulcanization are subjected to an inspection for sorting acceptance or rejection of uniformity by mounting each of the tires onto a given rim and applying a given internal pressure thereto. As a result, the tires showing a RFV value of more than a given rated value are removed from a forward line as a rejected product. These rejected tires are scrapped or subjected to modification for adjusting the RFV value to a range of the rated value.

And also, the uniformity of the tire includes a longitudinal deflection and a lateral deflection based on the dimensional change in addition to the above force variation. Among these deflections, the longitudinal deflection in the radial direction of the tire particularly affects the tire properties. The absolute value (maximum value) of the deflection in the radial direction is called as radial runout (hereinafter abbreviated as RR) and RR is said to have a close relation to RFV.

After RR is measured together with RFV by the inspection for sorting the acceptance or rejection of uniformity, tires having rejected RFV values are marked at a position showing a maximum value of RR without scrapping as far as possible and removed from the inspection line and subjected to RFV modification. The modification process is a process wherein the RFV-rejected tire is mounted onto a given rim and inflated under a given internal pressure and thereafter the marked surface of the tread rubber is subjected to buffing through a grinder to grind out only a partial area of the tread rubber by a gauge corresponding to RFV value to thereby decrease the RFV value.

Since the waveform of RR does not always correspond to the waveform of RFV as regards peak positions of both waveforms, a process for directly conducting RFV modification through the buffing is carried out in such a partial area along the circumference of the tread portion that centers a position showing a maximum value of RFV in a primary component taken out from the waveform of RFV.

However, even if the RFV value is modified to a proper range by the buffing to relieve the rejected tire according to anyone of the above processes, it is hardly impossible to perfectly repair the appearance of the tread portion subjected to the buffing, so that it is undeniable to lower the worth in the appearance of the tire. Furthermore, it should pay attention to a problem that the powder dust of the rubber caused by the buffing of the tread rubber worsens the working environment.

In JP-T-6-507858 (U.S. Pat. No. 5,616,859) is disclosed a process of modifying the uniformity, wherein RR comes up as a property of the modifying target of the uniformity and a part of a cord in at least one ply at a sidewall portion is subjected to a permanent deformation so as to render RR below an acceptable value and such a permanent deformation restrains a part of the tire other than a position to be modified under an inflation of a previously set pressure to restrict the stretching of the cord in the restrained part.

According to the process disclosed in the above publication, it is certainly possible to conduct the modification of RR within at least an acceptable range without damaging the appearance of the tire. However, the positions showing the maximum value and the minimum value do not always agree between RR and RFV as previously mentioned, and there is frequently caused a case that their positions widely shift each other.

And also, the correlation coefficient between RR and RFV is not so high even in the maximum value and minimum value. Because, RR is a phenomenon based on the unevenness at the cross-sectional shape of the tire, while RFV is a phenomenon based on the change of the rigidity along the circumference of the tire. The unevenness at the cross-sectional shape of the tire is caused by ununiform gauge of the tread portion along the circumference of the tire and the disorder in the arrangement of the constituting members arranged in the tread portion, especially the disorder in the cord arrangement of the cord layer constituting the belt. From this point, it is clear that RFV based on the change of the rigidity along the circumference of the tire is not always coincident with RR.

Moreover, in order to permanently deform a part of the ply cord of the carcass, it is required to apply a very high tension to the ply cord. For this purpose, the internal pressure of the tire should be a very high pressure, so that there is a fear of braking the tire during the permanent deformation of the cord.

Next, COF is a lateral force produced toward the rotating axial direction of the tire by running the tire under loading.

A significant point of COF lies in a force generated in a constant direction irrespectively of the rotating direction of the tire. COF is a force mainly generated when the tread portion and the belt arranged therein form a surface of cone frustum shape and corresponds to so-called camber thrust.

COF is measured by using a uniformity testing machine in the same manner as in the measurement of RFV. In the measurement, the lateral force generated from the tire is taken out at a state of dividing into forward rotation and backward rotation of the tire. The lateral force measured is shown in FIG. 16 as a diagram. As shown in FIG. 16, the lateral forces $LF_P$ and $LF_N$ vary in the rotation of the tire, respectively, and also the direction of generating the lateral force differs between the forward rotation and the backward rotation. In FIG. 16, the lateral force $LF_P$ in the forward rotation of the tire is shown at plus side (+) and the lateral force $LF_N$ in the backward rotation of the tire is shown at minus side (−).

COF is a direct component of the lateral force and is defined by $COF=(LF_{PW}$ and $LF_{NW})/2$ when abstracting the direct component $LF_{PW}$ (>0) of the lateral force $LF_P$ in the forward rotation of the tire and the direct component $LF_{NW}$ (<0) of the lateral force $LF_N$ in the backward rotation of the tire with reference to FIG. 16.

If the tires generating a large value of COF are mounted onto right and left sides of an axle so as to offset COF, there is hardly caused an influence upon the straight running property of the vehicle. On the contrary, if plural tires are accidentally mounted so as to generate COF in the same direction, the lateral force of a constant direction is always applied to the vehicle, so that the straight running property of the vehicle is remarkably obstructed.

In general, the modification of COF is carried out by a process wherein an end portion side of the tread rubber in the widthwise direction is subjected to buffing to cut out the tread rubber likewise the modification of RFV. As a process of modifying COF without buffing, the aforementioned JP-T-6-507858 (U.S. Pat. No. 5,616,859) discloses a process wherein permanent strain exceeding an elastic limit is applied to the ply cord of the carcass. However, it is an actual state that both processes for modifying COF have aforementioned problems irrespectively of the buffing or application of permanent strain exceeding the elastic limit to the ply cord.

SUMMARY OF THE INVENTION

It is, therefore, a first object of the invention to provide a process for modifying a uniformity of a tire capable of surely and effectively controlling RFV to a range of a given rated value while holding a good appearance without subjecting RFV-rejected tire to cutting work such as buffing or the like and without applying a considerably high internal pressure to the tire and without the danger of tire breakage.

It is a second object of the invention to provide a process for modifying a uniformity of a tire capable of advantageously and largely reducing COF to control COF level to a rated value without applying buffing or a remarkably high internal pressure to COF-rejected tire.

It is a third object of the invention to provide a tire obtained by applying either of the above two processes for the modification of uniformity to RFV-rejected tire and COF-rejected tire to modify proper RFV and COF properties while holding the appearance after vulcanization.

According to a first aspect of the invention, there is the provision of a process for modifying a uniformity of a tire comprising a carcass ply of rubberized organic fiber cords arranged side by side in a radial direction of the tire, which comprises the steps of measuring a radial force variation (RFV) of the tire inflated under a given internal pressure, putting a first distinguishing mark to a first tire portion indicating a minimum value of RFV, putting a second distinguishing mark to a second tire portion indicating a maximum value of RFV, applying different thermal hysteresis to the first tire portion and the second tire portion, and keeping a state of applying the given internal pressure to the tire during the cooling in the thermal hysteresis.

In a preferable embodiment of the first aspect of the invention, a waveform of a primary component is taken out from the measured RFV waveform and the first distinguishing mark is put to the first tire portion corresponding to a maximum value of the primary component waveform, and the second distinguishing mark is put to the second tire portion corresponding to a minimum value thereof. In another preferable embodiment of the first aspect of the invention, it is preferable that the internal pressure of the tire during the heating in the thermal hysteresis is either an atmospheric pressure communicating to air or a weak pressure.

The first aspect of the invention mentioned above includes two ways for modifying RFV. In a first way, at least a sidewall portion of the first tire portion is heated to make a temperature thereof higher than that of the second tire portion at the finish of the heating in the thermal hysteresis. Moreover, the term "thermal hysteresis" used herein means a hysteresis ranging from a start of the heating to a finish of the cooling.

In the thermal hysteresis according to the invention, the following two heating means are favorable as regards the heating.

(1) Only at least sidewall portion of the first tire portion is partially heated at a given temperature.

(2) At least sidewall portions of the first tire portion and the second tire portion are heated at different amounts of heat, respectively.

It is favorable that the heating is carried out so as to make an internal temperature of at least sidewall portion of the first tire portion higher by no less than 40° C. than that of at least sidewall portion of the second tire portion at the finish of the heating of the tire.

Further, as the cooling in the thermal hysteresis according to the invention, the following two cooling means are favorable.

(3) The whole of the tire subjected to the heat is spontaneously cooled.

(4) At least sidewall portion of the first tire portion is slowly cooled at a cooling rate slower than that of at least sidewall portion of the second tire portion.

The term "spontaneous cooling" used herein means that the surroundings of the tire are cooled while being exposed at room temperature or an atmospheric temperature.

In a second way of the RFV modification process, the whole of the tire is uniformly heated at the same temperature and at least sidewall portion of the second tire portion in the tire after the finish of the heating is cooled at a cooling rate faster than that of at least sidewall portion of the first tire portion.

As to the cooling, it is favorable that at least sidewall portion of the second tire portion is quenched by force-cooling and at least sidewall portion of the first tire portion is slowly cooled by spontaneous cooling.

According to a second aspect of the invention, there is the provision of a process for modifying a uniformity of a tire having a carcass ply of rubberized organic fiber cords arranged side by side in the radial direction, which comprises the steps of measuring a quantity and a direction of a conicity force (COF) of the tire inflated under a given internal pressure, putting a third distinguishing mark to a first half tire part located in COF generating direction when the tire is divided into first and second half tire parts with respect to an equatorial plane of the tire, and applying different thermal hysteresis to the first half tire part and the second half tire part, and applying the given internal pressure to the tire during a period ranging from a middle stage to a last stage of a cooling in the thermal hysteresis.

In a preferable embodiment of the second aspect of the invention, the thermal hysteresis is carried out by uniformly heating the whole of the tire, and cooling the first half tire part having the third distinguishing mark at a temperature lower than that of the second tire half-part in at least an initial stage of the cooling of the tire.

In another preferable embodiment of the second aspect of the invention, the internal pressure of the tire is made either an atmospheric pressure or a weak pressure during a period ranging from an initial stage to a middle stage of the cooling in the thermal hysteresis.

In the other preferable embodiment of the second aspect of the invention, the first half tire part is cooled at a cooling rate faster than that of the second half tire part during a period ranging from an initial stage of the cooling of the tire to at least an application of the given internal pressure to the tire.

In order to apply different cooling rates, it is preferable that the first half tire is quenched by force-cooling and the second half tire part is slowly cooled by spontaneous cooling.

As to the heating in the thermal hysteresis, it is favorable that the internal pressure of the tire during the heating is made either an atmospheric pressure communicating to air or a weak pressure.

According to a third aspect of the invention, there is the provision of a pneumatic tire applied to the process for modifying the tire uniformity relating to RFV mentioned above, in which in a carcass ply of organic fiber cords arranged side by side in the radial direction, a modulus of elasticity of the organic fiber cord located in at least sidewall portion of the first tire portion is larger than that in at least sidewall portion of the second tire portion.

According to a fourth aspect of the invention, there is the provision of a pneumatic tire applied to the process for modifying the tire uniformity relating to COF mentioned above, in which in a carcass ply of organic fiber cords arranged side by side in the radial direction, a modulus of elasticity of the organic fiber cord located in the first half tire part is smaller than that in second half tire part.

In the tires according to the third and fourth aspects of the invention, the difference in the elastic modulus of the organic fiber cord is a significant of at least 5% in a significant examination using a statistical method.

BRIEF DESCRIPTION OF THE DRAWINGS

The invention will be described with reference to the accompanying drawings, wherein.

DESCRIPTION OF THE PREFERRED EMBODIMENTS

An outline of an embodiment of the process for modifying a uniformity of a tire according to the invention is described with respect to a tire shown in FIG. 1, and details of the process for modifying RFV are described with reference to FIGS. 2–9, and then details of the process for modifying COF are described with reference to FIG. 10.

Figure 1:
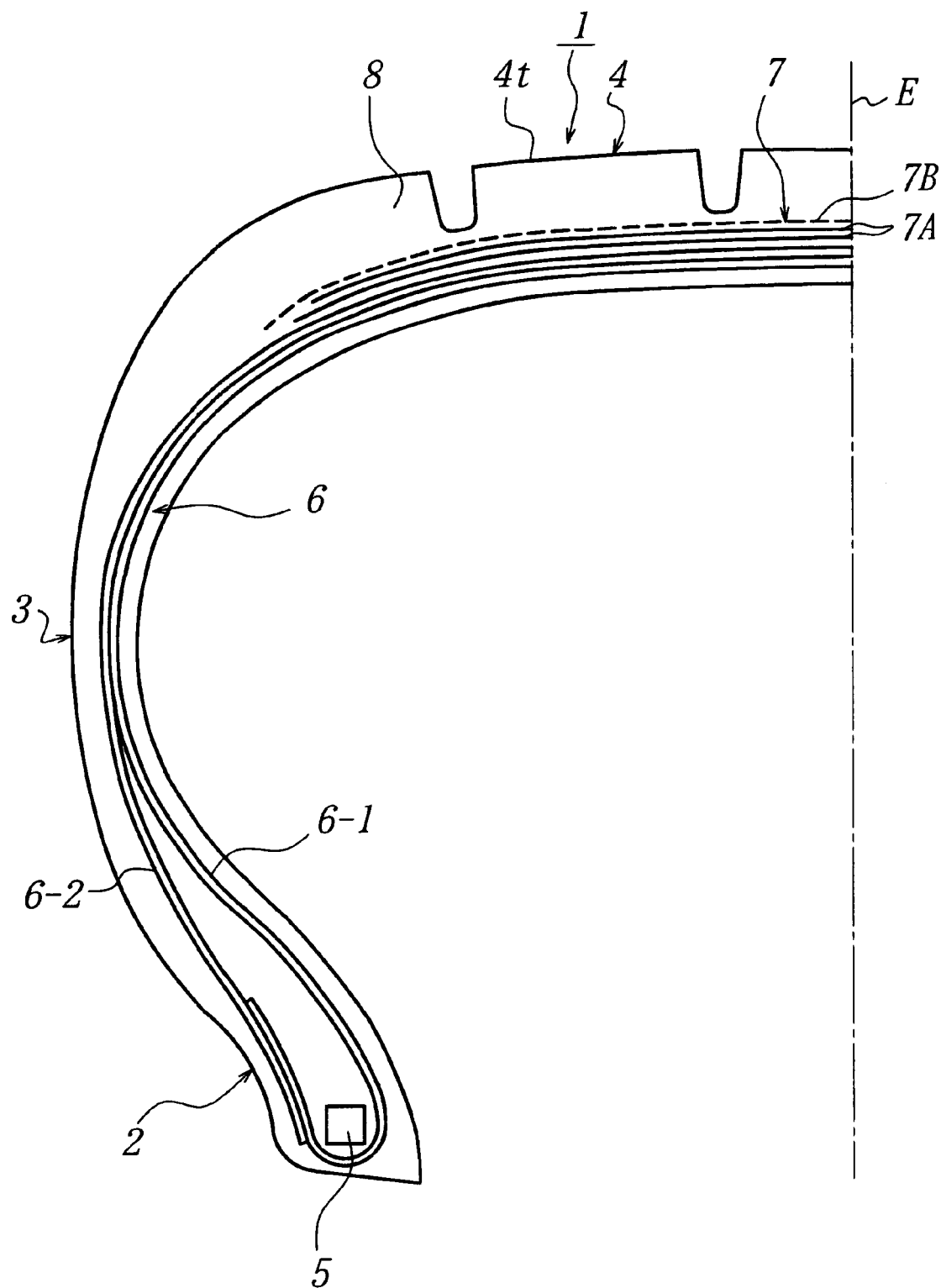
FIG. 1 is a diagrammatically left-half section view of a first embodiment of the pneumatic tire according to the invention.

In FIG. 1 is shown a diagrammatically left-half section of the tire according to the invention.

The tire 1 shown in FIG. 1 is a radial tire for a passenger car. The tire 1 comprises a pair of bead portions 2 (only one side thereof is shown), a pair of sidewall portions 3 (only one side thereof is shown), and a tread portion 4 linked to both sidewall portions 3. These portions 2, 3 and 4 are reinforced with a carcass 6 extending between a pair of bead cores 5 embedded in the respective bead portions 2 and comprised of at least one ply (two plies 6-1 and 6-2 in the illustrated embodiment), and a belt 7 is arranged on an outer circumference of the carcass 6 to reinforce the tread portion 4.

Each of the plies 6-1 and 6-2 of the carcass 6 is a ply of rubberized organic fiber cords arranged side by side in the radial direction. The organic fiber cord used in the carcass 6 includes, for example, nylon-6 cord, nylon-66 cord, polyester cord, rayon cord and the like. The belt 7 comprises two or more rubberized cross cord layers 7A and a cap belt layer 7B covering the outer circumference thereof. In the belt 7, the cross cord layers 7A are always existent, but the cap belt layer 7B. may be omitted in accordance with the kind of the tires. A tread rubber 8 is arranged around the belt 7.

The above tire 1 is a typical embodiment applied to the processes for modifying the uniformity according to the invention as mentioned below. Firstly, there will be explained the process for modifying RFV among the processes for modifying the uniformity.

The cured tire 1 to be inspected for uniformity is subjected to a post-cure inflation (hereinafter abbreviated as PCI) at a high temperature just after the curing and spontaneously cooled to room temperature. All of the tires 1 cooled to room temperature are fed to an inspection step for judging acceptance or rejection of RFV among various uniformity properties, at where RFV is measured by an apparatus for measuring the uniformity at a state of inflating under a given internal pressure to conduct automatic selection. In this case, tires exceeding a rated value of RFV (upper limit) are putted with a distinguishing mark at a position indicating at least one of a lower RFV value and a minimum value near thereto and removed out from the inspection line and then transferred to a step for modifying the uniformity.

Figure 11:
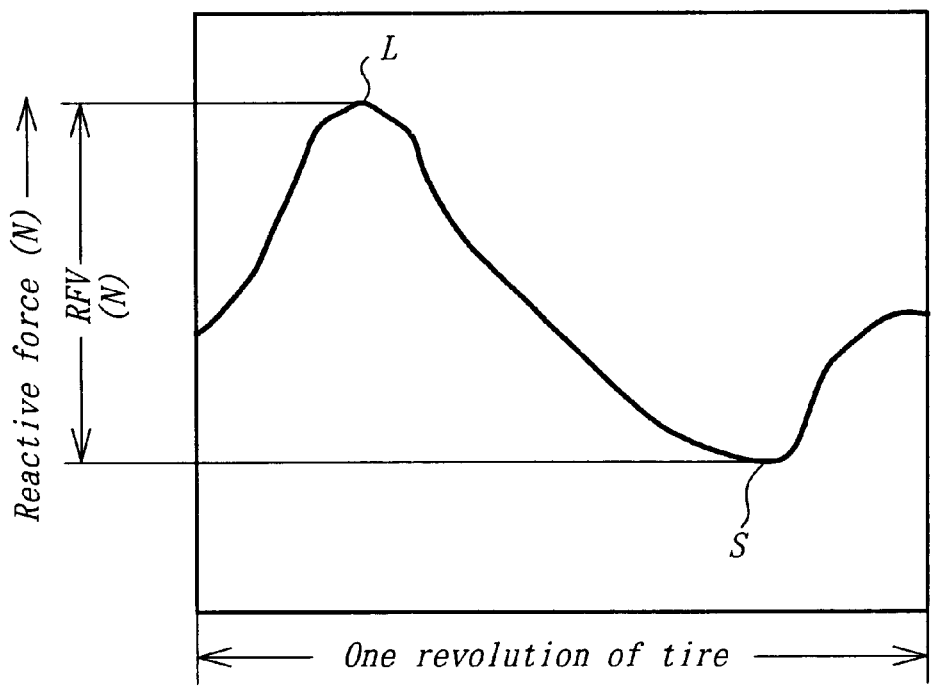
FIG. 11 is a diagram of a primary component of RFV.

In the automatic selection of RFV, it is preferable to take out only a waveform of a primary component from the RFV waveform including high degree components by Fourier waveform analysis of an output from the uniformity measuring apparatus as shown in FIG. 11. According to this procedure, the burden of specifying the minimum value and the maximum value is removed and it is enough to specify only two positions corresponding to a position S of the lower limit and a position L of the upper limit in RFV. The positions S and L means a cross sectional region along the radial direction of the tire 1.

In the measurement of RFV, a first distinguishing mark $M_S$ is automatically put at the position S of the lower limit, and a second distinguishing mark $M_L$ is automatically put at the position L of the upper limit, respectively (see FIGS. 2–5). It is simple and favorable to use, for example, different colored marks as these distinguishing marks.

Considering the handling of the tire 1 in the RFV modification mentioned below, it is favorable to put the distinguishing mark at a position easily visible from the outside of the tire such as a ground contact surface 4t of the tread portion (see FIG. 1), a surface of the sidewall portion 3 or the like of the tire 1 in order to distinguish at first sight.

A different thermal hysteresis is given to a first tire portion 1a putted with the first distinguishing mark $M_S$ and a second tire portion 1b putted with the second distinguishing mark $M_L$, respectively. The thermal hysteresis comprises a heating cycle and a cooling cycle after the finish of the heating.

A given internal pressure is applied to the tire 1 during the cooling cycle. The term "given internal pressure" used herein means concretely an internal pressure of a practical use range which is not more than a maximum air pressure disclosed in "LOAD/INFLATION PRESSURE TABLE" of JATMA YEAR BOOK (1998) every a group of tires to be modified. In general, the internal pressure is preferable to be within a range of 100–500 kPa. In case of the tire 1 for passenger car, the internal pressure is preferable to be within a range of 100–300 kPa.

Two ways are applied in the application of the different thermal hysteresis to the tire 1. A first way is a way wherein a heating temperature of the first tire portion 1a is made higher than a heating temperature of the second tire portion 1b. A second way is a way wherein a cooling rate of the second tire portion 1b is made faster than a cooling rate of the first tire portion 1a after the tire 1 is heated at the same heating temperature.

In the first way, a modulus of elasticity of the organic fiber cord in the carcass ply 6-1, 6-2 of the carcass 6 at the first tire portion 1a becomes lower than that at the second tire portion 1b in the finish of the heating. However, since the internal pressure is applied to the inside of the tire 1, tension acts to the organic fiber cords of the plies 6-1, 6-2, so that the modulus of elasticity in the organic fiber cord of the plies 6-1, 6-2 at the first tire portion 1a heated at a higher temperature becomes higher than that of the ply 6-1, 6-2 at the second tire portion 1b in the finish of the cooling and hence a reactive force at the lower limit S of RFV increases. On the other hand, a reactive force at the upper limit L of RFV hardly changes, so that the value of RFV becomes smaller than that before modifying and hence the RFV value of the tire 1 can be rendered into a range of a desired value.

In the second way, the modulus of elasticity in the organic fiber cords of the plies 6-1, 6-2 is the same as the whole of the tire 1 in the finish of the heating. In case of cooling the organic fiber cords of the plies 6-1, 6-2 subjected to tension by applying the internal pressure to the tire 1, however, the cooling rate of the second tire portion 1b is made faster than that of the first tire portion 1a, so that the modulus of elasticity in the organic fiber cords of the plies 6-1, 6-2 at the second tire portion 1b becomes lower than that of the plies 6-1, 6-2 at the first tire portion 1a in the finish of the cooling. As a result, the reactive force at the upper limit L of RFV lowers, while the reactive force at the lower limit S of RFV hardly changes, so that the value of RFV becomes smaller than that before modifying and hence the RFV value of the tire 1 can be rendered into a range of a desired value.

Next, details of the process for modifying RFV according to the first way will be described with reference to FIGS. 2–5.

Figure 2:
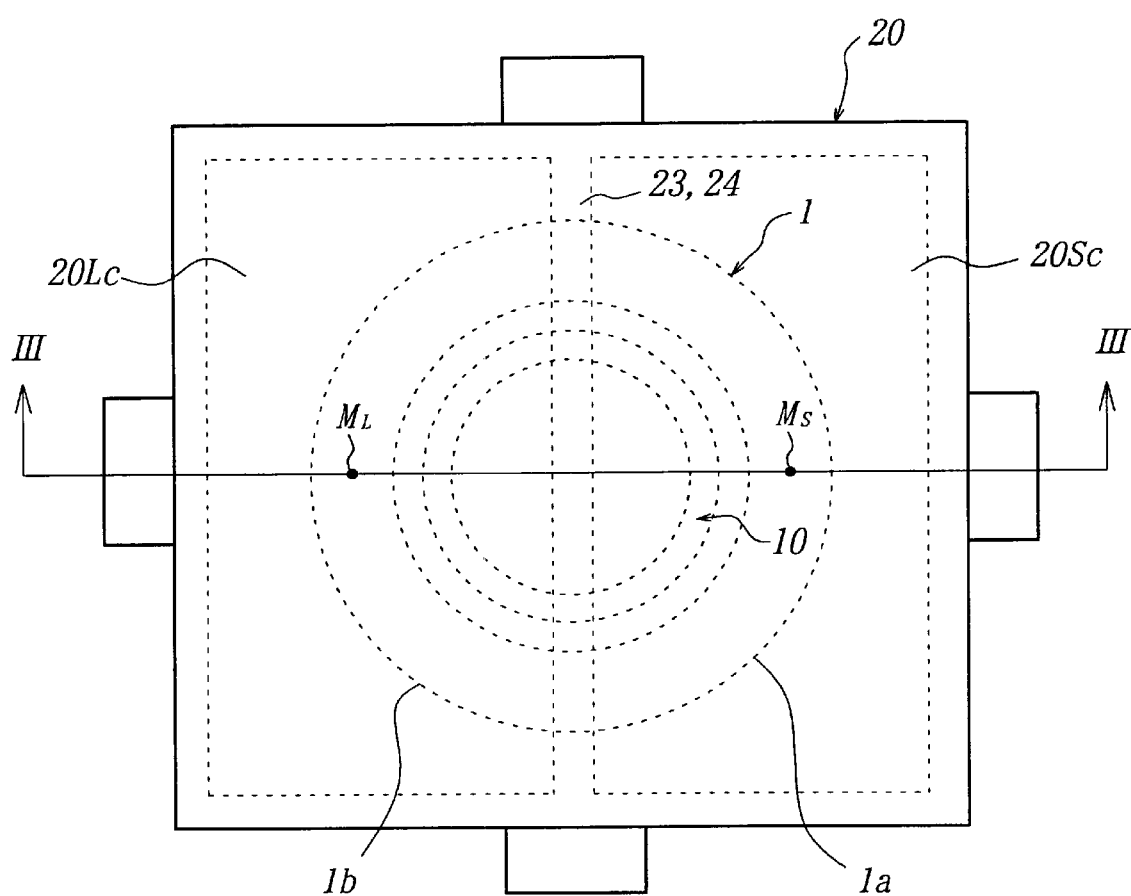
FIG. 2 is a schematically plan view of a main part of an apparatus for heating a tire.
Figure 3:
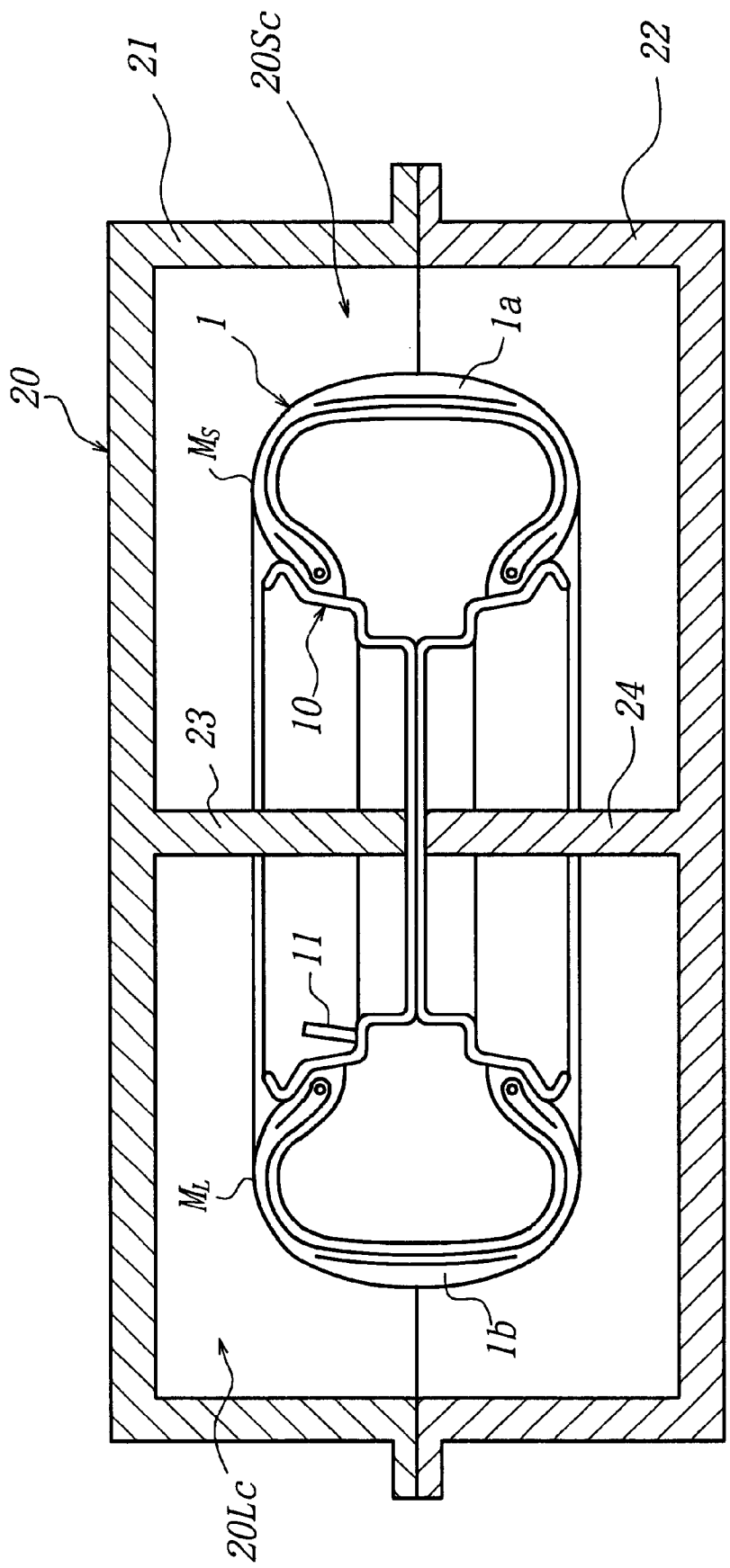
FIG. 3 is a diagrammatically section view taken along a line III—III of FIG. 2.
Figure 4:
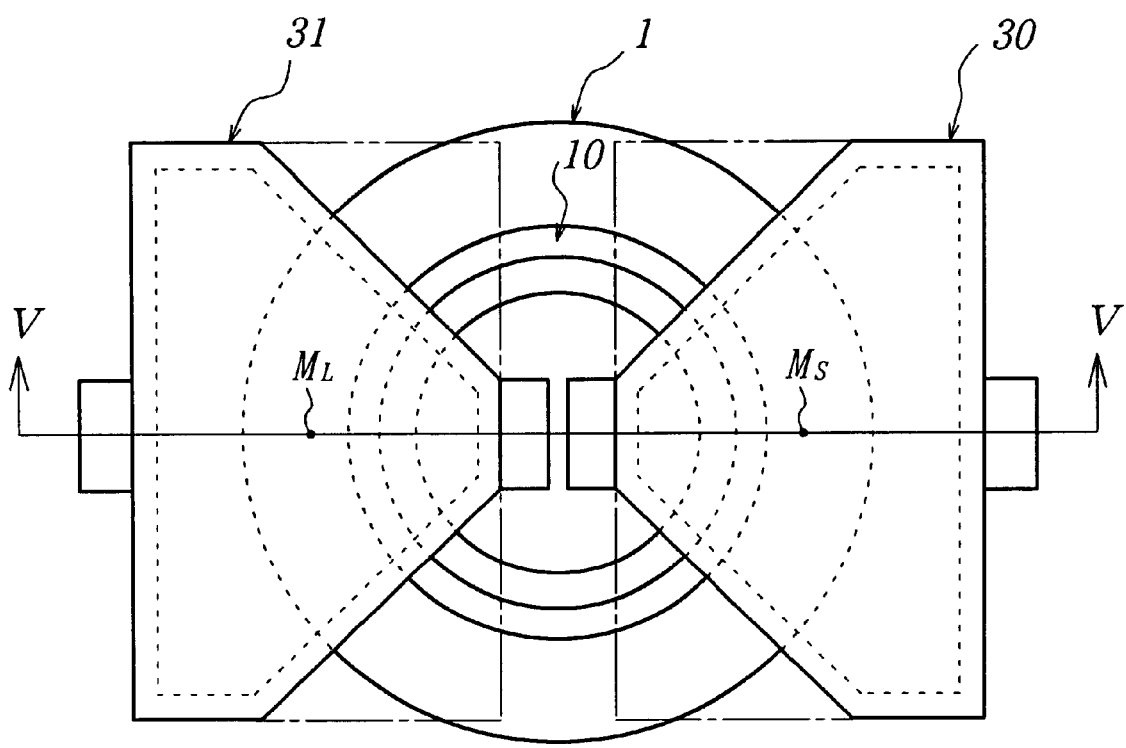
FIG. 4 is a schematically plan view of a main part illustrating a modified embodiment of the heating apparatus shown in FIG. 2.
Figure 5:
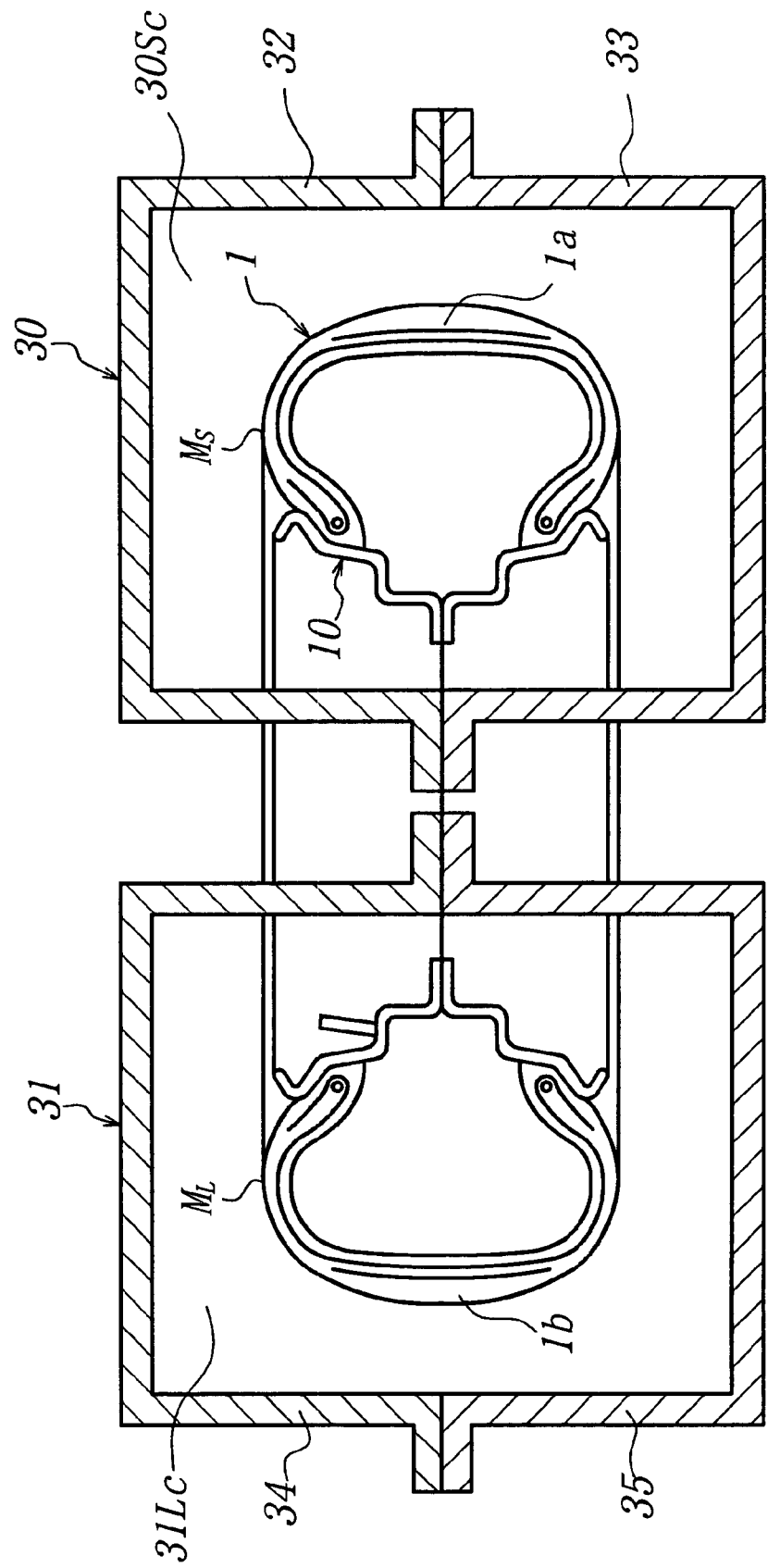
FIG. 5 is a diagrammatically section view taken along a line V—V of FIG. 4.

FIG. 2 is a plan view of a main part of an embodiment of the apparatus for heating the tire 1, and FIG. 3 is a section view taken along a line III—III of FIG. 2, and FIG. 4 is a plan view of a main part of a modified embodiment of the heating apparatus shown in FIG. 2, and FIG. 5 is a section view taken along a line V—V of FIG. 4.

In FIGS. 2–5, the tire 1 is mounted onto a two-split wheel 10 having approved rim width and shape for applying the internal pressure to the tire 1. It is convenient to use a rim for PCI as the wheel 10. The wheel 10 has a valve 11 for applying the internal pressure. Moreover, the term "approved rim" used herein means a rim disclosed in JATMA YEAR BOOK (1998), TRA YEAR BOOK (1998), and ETRTO DATA BOOK (1998).

The heating apparatus shown in FIGS. 2 and 3 comprises a heating box 20 formed by integrally uniting two-split box segments 21 and 22, and each of the box segments 21,22 is provided with a partition wall 23, 24. The inside of the heating box 20 is partitioned into a space $20S_C$ and a space is $20L_C$ by the partition walls 23 and 24, and the tire 1 and the wheel 10 are housed in the spaces $20S_C$, $20L_C$ at a floated state through a support (not shown).

In this case, as shown in FIG. 2, the first distinguishing mark $M_S$ is located in approximately a center of the space $20S_C$ and the second distinguishing mark $M_L$ is located in approximately a center of the space $20L_C$. Moreover, the partition walls 23, 24 are rendered into a shape matched with the shape of the tire 1 and the shape of the wheel 10, whereby the connection between the mutual spaces $20S_C$ and $20L_C$ is intercepted to obstruct heat flow.

The heating apparatus shown in FIGS. 4 and 5 comprises separate-type heating boxes 30 and 31. The heating box 30 is an integrated body of two-split box segments 32, 33 and the heating box 31 is an integrated body of two-split box segments 34, 35. The heating boxes 30, 31 shown by a solid line in FIG. 4 have a fan-shaped plan and comprise spaces $30S_C$ and $31L_C$ narrower than the spaces $20S_C$ and $20L_C$ shown in FIGS. 2 and 3. In these spaces $30S_C$, $31L_C$ are housed a part of the tire 1 and a part of the wheel 10 at a floated state through a support (not shown).

In this case, as shown in FIG. 4, the first distinguishing mark $M_S$ is located in approximately a center of the space $30S_C$ and the second distinguishing mark $M_L$ is located in approximately a center of the space $31L_C$. Moreover, the two-split box segments 32, 33 and the two-split box segments 34, 35 are rendered into a shape matched with the shape of the tire 1 and the shape of the wheel 10, respectively, whereby the connection of each of the respective spaces $30S_C$, $31L_C$ to an exterior is intercepted to obstruct heat flow. Further, the space $30S_C$, $31L_C$ of the heating boxes 30, 31 may be enlarged in accordance with the condition of RFV distribution curve as shown by a phantom line in FIG. 4.

Into the space $20S_C$ of the heating box 20 and the space $30S_C$ of the is heating box 30 is supplied a high-temperature heating gas such as high-temperature steam or the like. By the heating gas is heated a part of at least sidewall portion 3 in the first tire portion 1a, or the first tire portion 1a including the bead portion 2, the sidewall portion 3 and the tread portion 4 in the illustrated embodiment. Moreover, means for supplying the heating gas is omitted in its illustration.

On the other hand, at least sidewall portion 3 of the second tire portion 1b, or the second tire portion 1b including the bead portion 2, the sidewall portion 3 and the tread portion 4 in the illustrated embodiment is not subjected to the heating, or even if the heating is carried out, the second tire portion 1b is heated by using a heating gas of a temperature remarkably lower than the heating gas for the first tire portion 1a. When the heating of the second tire portion 1b is not required, the heating gas is not supplied to one space $20L_C$ of the heating box 20 and the space $31L_C$ of the heating box 31, respectively. In case of the heating apparatus shown in FIG. 4, the heating box 31 can be removed.

After the finish of the heating, the supply of the heating gas is stopped and the tire 1 is taken out from the heating box 20, 30, 31 and inflated immediately with a compressed air of a given pressure at room temperature through the valve 10. Moreover, the inside of the tire 1 is either an atmospheric pressure communicating to air or substantially a weak pressure during the heating. In general, the internal pressure of the tire 1 is suitable to be within a range of 100–500 kPa. In case of the tire for passenger car, the internal pressure of 100–300 kPa is suitable. Then, the tire 1 inflated under the internal pressure is cooled.

By applying different thermal hysteresis and applying the internal pressure to the first tire portion 1a and the second tire portion 1b of the tire 1 as mentioned above, the modulus of elasticity in the organic fiber cords of the carcass plies 6-1, 6-2 at the first tire portion 1a on the higher temperature mark side $M_S$ (former cord) is more increased as compared with the modulus of elasticity in the organic fiber cords of the carcass plies 6-1, 6-2 at the second tire portion 1b on the lower temperature mark side $M_L$ (latter cord) as mentioned later.

That is, a filament crystallinity and a degree of amorphous molecule orientation in the former cord are lowered as compared with those in the latter cord at the finish of the heating to more promote so-called relaxation, so that the modulus of elasticity in the former cord becomes lower. On the other hand, when the internal pressure is applied to the tire 1, the former cord becomes larger in the stretching degree through tension and higher in the temperature as compared with those of the latter cord, so that the filament crystallinity and the degree of amorphous molecule orientation are increased. As a result, the modulus of elasticity in the former cords of the plies 6-1, 6-2 becomes higher than that of the latter cord at the finish of the cooling.

Figure 12:
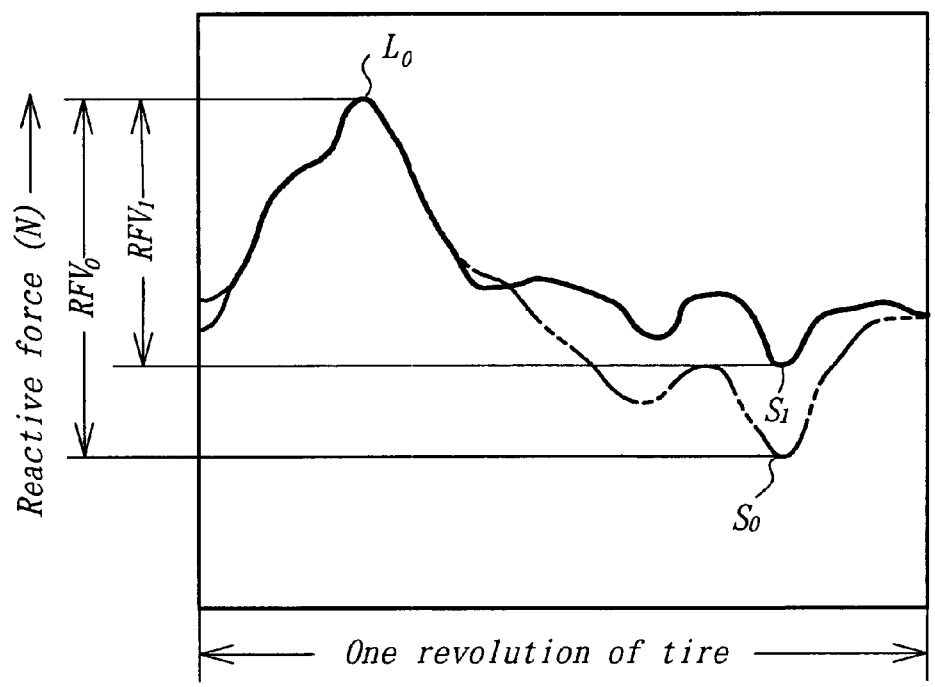
FIG. 12 is a diagram before and after RFV modification by a first way in RFV modifying process according to the invention.

As a result that the modulus of elasticity in the former cords of the plies 6-1, 6-2 of the carcass 6 in the tire 1 becomes higher than that of the latter cord, a longitudinal rigidity (rigidity in the radial direction) of the first tire portion 1a at the side of mark $M_S$, that is, a longitudinal spring constant becomes larger than that of the second tire portion 1b at the side of mark $M_L$. Therefore, as shown by a solid line in FIG. 12, the reactive force of the first tire portion 1a is largely enhanced from a reactive force $S_0$ of the original first tire portion as shown by a phantom line in FIG. 12 to a reactive force $S_1$, and RFV is largely decreased from $RFV_0$ to $RFV_1$.

The second tire portion 1b located on the side of the mark $M_L$ may be held at room temperature without being subjected to the heating. If it is intended to conduct the heating, it is preferable to provide a temperature difference of not less than 40° C. to the heating temperature of the first tire portion 1a located on the side of the mark $M_S$. In fact, it is suitable to advantageously realize the above difference between longitudinal spring moduli by rendering the heating temperature of the first tire portion 1a into a range of 120–130° C. and the heating temperature of the second tire portion 1b into a range of 60–80° C.

The heating time is a time until the organic fiber cords of the carcass plies 6-1, 6-2 of the carcass 6 in the tire 1 reaches to at least the temperature of the heating gas or a temperature near thereto. In case of the tire 1 for passenger car, the heating time is favorable to be within a range of 5–15 minutes.

With respect to the tire 1 after the finish of the heating, there may be used a way wherein the whole of the tire 1 is spontaneously cooled at an atmosphere temperature outside the boxes 20, 30, 31, and a way wherein the first tire portion 1a located on the side of the first distinguishing mark $M_S$ is slowly cooled at a cooling rate slower than that of the second tire portion 1b located on the side of the second distinguishing mark $M_L$. The cooling time is preferable to be within a range of about 10–30 minutes in case of the tire 1 for passenger car.

Since the longitudinal rigidity of the tire 1 as a whole is generally favorable to become larger as far as possible, it is advantageous that the second tire portion 1b located on the side of the second distinguishing mark $M_L$ is spontaneously cooled at the outside of the box 31 and the first tire portion 1a located on the side of the first distinguishing mark $M_S$ is slowly cooled in the space $30S_C$ of the box 30. The application of the slow cooling brings about a merit that the difference between the longitudinal spring moduli increases and an amount raising from the reactive force $S_0$ to the reactive force $S_1$ becomes large.

In order to sufficiently achieve the relaxation of the organic fiber cords embedded in the plies 6-1, 6-2, the inside of the tire 1 communicates to air during the heating and tension is not applied to the cords. If it is required to previously fit the tire 1 onto the wheel 10 for facilitating the application of the internal pressure, however, after the given internal pressure is applied to the tire 1, the inside of the tire may be rendered into a state of a weak pressure. In this point, when the two-split rim constituting elements used in the PCI step as mentioned above are applied to the wheel 10, there is obtained an advantage that the previous fitting work and the filling of the weak pressure are useless. The term "weak pressure" used herein concretely means a low pressure of no more than 150 kPa.

In the tire 1 applied to the process for modifying RFV based on the first way and comprising the carcass 6 of the plies 6-1, 6-2 containing many organic fiber cords of the radial arrangement, the organic fiber cord located in at least sidewall portion of the first tire portion 1a has a modulus of elasticity larger than that of the organic fiber cord located in at least sidewall portion of the second tire portion 1b.

Next, details of the process for modifying RFV according to the second way will be explained with reference to FIGS. 6–9.

Figure 6:
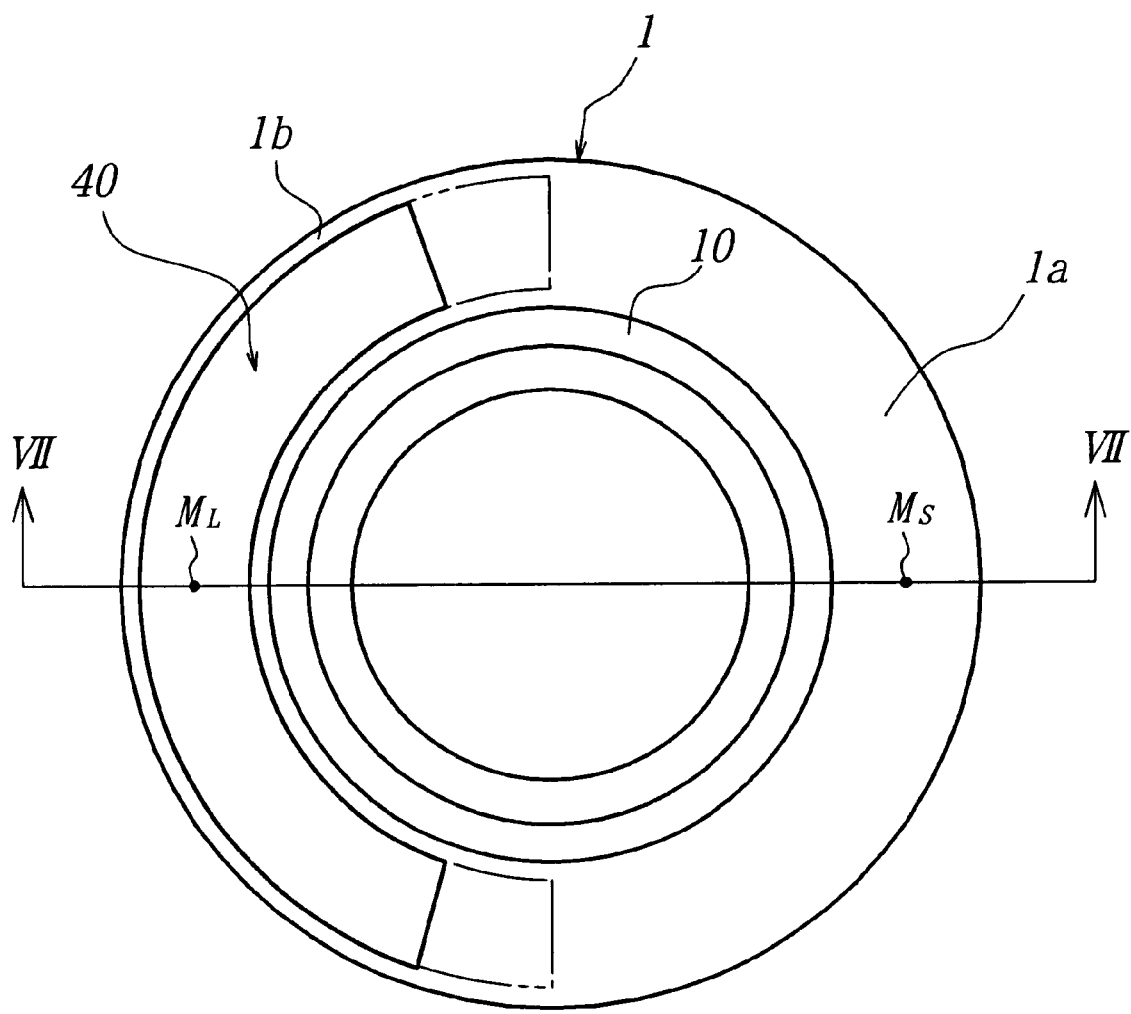
FIG. 6 is a schematically plan view of a simplified apparatus for cooling a tire.
Figure 7:
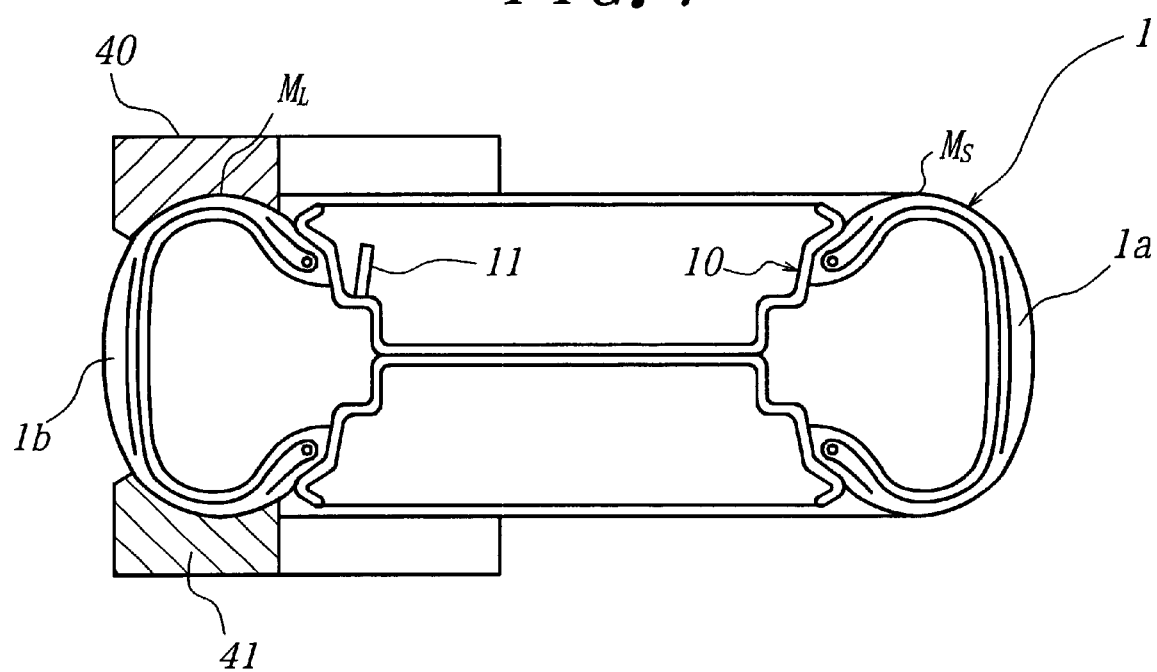
FIG. 7 is a diagrammatically section view taken along a line VII—VII of FIG. 6.
Figure 8:
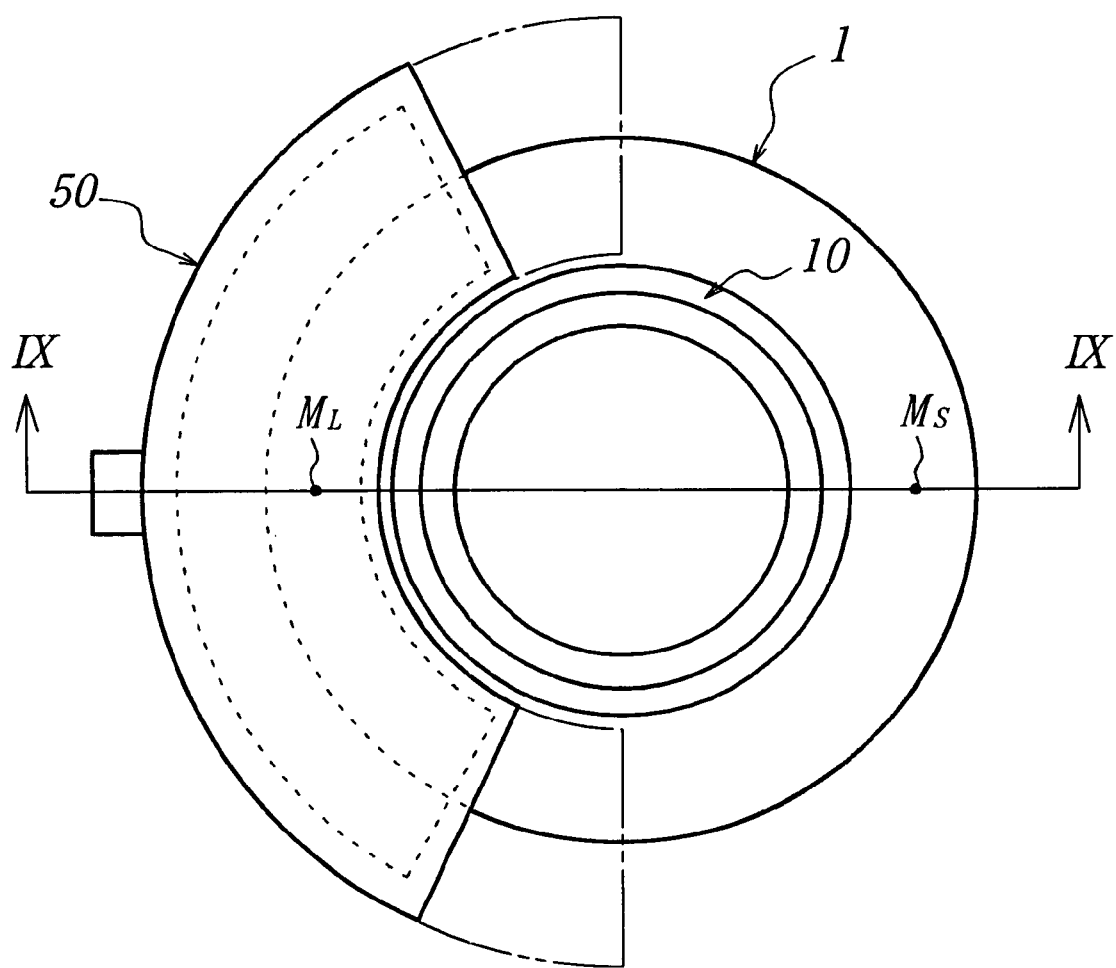
FIG. 8 is a schematically plan view of another apparatus for cooling a tire.
Figure 9:
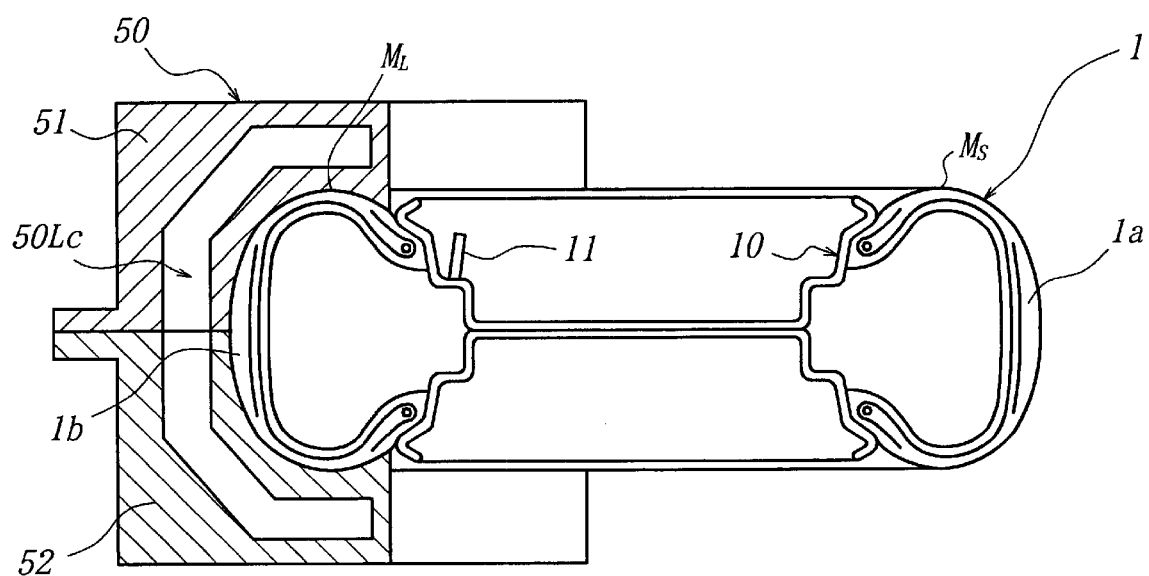
FIG. 9 is a diagrammatically section view taken along a line IX—IX of FIG. 8.

FIG. 6 is a schematically plan view of an outline of a simplified apparatus for cooling the tire 1, FIG. 7 is a diagrammatically section view taken along a line VII—VII of FIG. 6, FIG. 8 is a schematically plan view of an outline of another apparatus for cooling the tire 1, and FIG. 9 is a diagrammatically section view taken along a line IX—IX in FIG. 8.

At first, the tire 1 putted with the distinguishing marks $M_L$, $M_S$ and the wheel 10 are previously heated by the heating means (not shown) until the whole of the tire 1 reaches to a given uniform temperature. The heating means is not particularly restricted, but may be an equipment such as a hot-blast circulating furnace, or means for enclosing a high-temperature steam into the inside of the tire 1, or both of them. The temperature inside the tire 1 at the finish of the heating is preferable to be within a range of 120–170° C.

Particularly, when the organic fiber cord in the plies 6-1, 6-2 is nylon-6 cord or nylon-66 cord, the temperature is more favorable to be within a range of 120–130° C.

The cooling of the tire 1 after the finish of the heating will be explained with respect to the use of the simple apparatus shown in FIGS. 6 and 7 and the use of the apparatus shown in FIGS. 8 and 9 as a typical example, respectively. During the cooling in the thermal hysteresis, the tire is rendered into a state of applying the given internal pressure to the tire. Moreover, the internal pressure of the tire 1 is either an atmospheric pressure communicating to air or a weak pressure at most during the heating.

The cooling of the tire 1 by the apparatus shown in FIGS. 6 and 7 is a way wherein the sidewall portion 3 in the second tire portion 1b mainly located on the side of the mark $M_L$ is forcedly quenched by abutting on a metallic cooling plate below room temperature (20–25° C.). On the other hand, the first tire portion 1a located on the side of the mark $M_S$ is slowly cooled or spontaneously cooled at an exposed state.

In this case, a cooling gas of not higher than 20–25° C., for example, a cold air is blown onto the cooling plates 40, 41 to prevent the temperature rise of the cooling plates 40, 41, if necessary. Moreover, although the illustration is omitted, the cooling plates 40, 41 may be made to a hollow body and a cooling water or a cooling gas (cold air) may be circulated in the hollow body. And also, the cooling region of the cooling plates 40, 41 may be enlarged as shown by a phantom line in FIG. 6.

The cooling of the tire 1 by the apparatus shown in FIGS. 8 and 9 is a way wherein almost all of the second tire portion 1b located on the side of the mark $M_L$ is forcedly cooled by using a cooling box 50 of a cold air circulating type. The cooling box 50 consists of two-split type metallic box segments 51 and 52 and is provided on its inside with a cavity $50L_C$. The cooling rate is adjusted by circulating the cooling water or the cooling gas in the cavity $50L_C$. Even in this case, the first tire portion 1a located on the side of the mark $M_S$ is spontaneously cooled at the exposed state.

In case of the tire 1 for passenger car, the cooling rate of the second tire portion 1b is suitable to be within a range of 20–40° C./min, and the cooling rate of the first tire portion 1a is suitable to be within a range of 10–20° C./min, and it is desirable that the cooling rate of the former is at least two times that of the latter. The time for providing different cooling rates is referable to be within a range of about 1–5 minutes. Moreover, as shown by a phantom line in FIG. 8, the cooling region of the cooling box 50 may be enlarged.

By the applications of the different cooling rate between the first tire portion 1a and the second tire portion 1b and of the internal pressure with respect to the tire 1 mentioned above, the modulus of elasticity in the organic fiber cords (the former cord) of the carcass plies 6-1, 6-2 of the second tire portion 1b treated at a faster cooling rate becomes more lower than that in the organic fiber cords (the latter cord) of the carcass plies 6-1, 6-2 of the first tire portion 1a treated at a slower cooling rate as mentioned below.

That is, the organic fiber cords of the plies 6-1, 6-2 in the tire 1 reach to a uniform and high temperature over the whole thereof and are uniformly relaxed at the finish of the heating. However, the respective progress of the filament crystallinity and the degree of amorphous molecule orientation in the former cord treated at a faster cooling rate is largely delayed as compared with the PCI case of spontaneous cooling by leaving during a period ranging from the start of the cooling to the finish thereof. As a result, the modulus of elasticity in the organic fiber cord of the second tire portion 1b becomes lower than that in the original state.

On the other hand, the organic fiber cords of the plies 6-1, 6-2 of the first tire portion 1a through the thermal hysteresis of spontaneous cooling at a slower cooling rate hold the original modulus of elasticity. As a result, the organic fiber cords of the plies 6-1, 6-2 in the second tire portion 1b have becomes lower in the modulus of elasticity as compared with those in the first tire portion 1a at the finish of the cooling.

Figure 13:
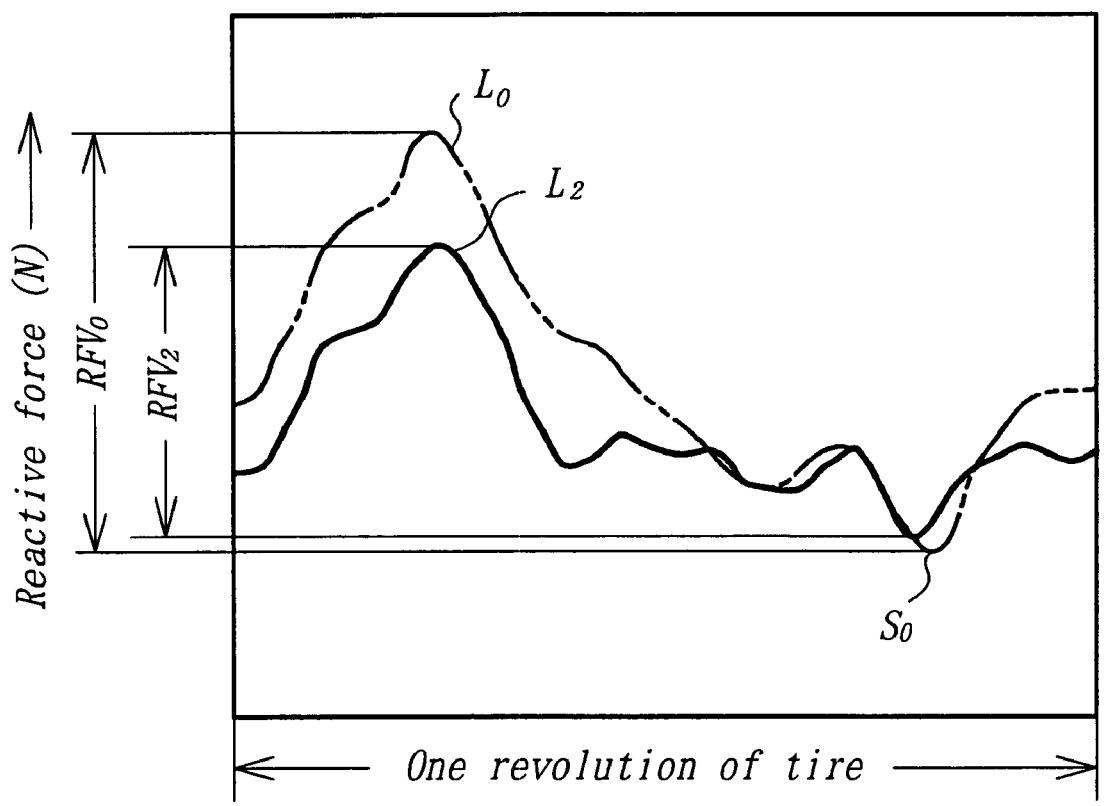
FIG. 13 is a diagram before and after RFV modification by a second way in RFV modifying process according to the invention.

The longitudinal spring modulus of the second tire portion 1b is also lowered by a value of subtracting the modulus of elasticity in the organic fiber cords of the plies 6-1, 6-2 in the second tire portion 1b from their original modulus of elasticity, so that the reactive force of the second tire portion 1b largely decreases from the reactive force $L_0$ of the original second tire portion 1b shown by a phantom line to the reactive force $L_2$ shown by a solid line as shown in FIG. 13, and RFV largely lowers from $RFV_0$ to $RFV_2$.

As mentioned above, it is possible to easily modify the value of RFV from $RFV_0$ to $RFV_1$ and from $RFV_0$ to $RFV_2$ only by subjecting the first tire portion 1a and the second tire portion in the tire 1 to the different thermal hysteresis.

According to this process, it is possible to conduct an accurate RFV modification because it is not an indirect RFV modification through the conventional RR but directly add the modification to the first tire portion 1a having the lower limit S of RFV or the second tire portion 1b having the upper limit L thereof. Secondarily, the appearance of the tire 1 just after the building through vulcanization can be maintained as it is, and there is not caused the occurrence of ducts such as buffed dusts and the like, so that it develops an effect capable of holding a good work environment.

In the tire 1 applied to the process for modifying RFV based on the second way as mentioned above, the organic fiber cords located in at least sidewall portion of the second tire portion 1b have a modulus of elasticity lower than that of the organic fiber cords located in at least sidewall portion of the first tire portion 1a.

Next, the process for modifying COF among the processes for modifying the uniformity will be explained.

In all tires 1 after PCI, a quantity and a generating direction of COF at a state of applying a given internal pressure are measured by an apparatus for measuring the uniformity at an inspection step to automatically judge acceptance or rejection based on the COF quantity. If the tire is divided into first and second half tire parts 1c and 1d with respect to an equatorial plane E of the tire, rejected tires 1 exceeding a rated COF value are putted with a third distinguishing mark $M_C$ at the first half tire part 1c showing the generating direction of COF and transferred to a step for modifying COF.

Figure 10:
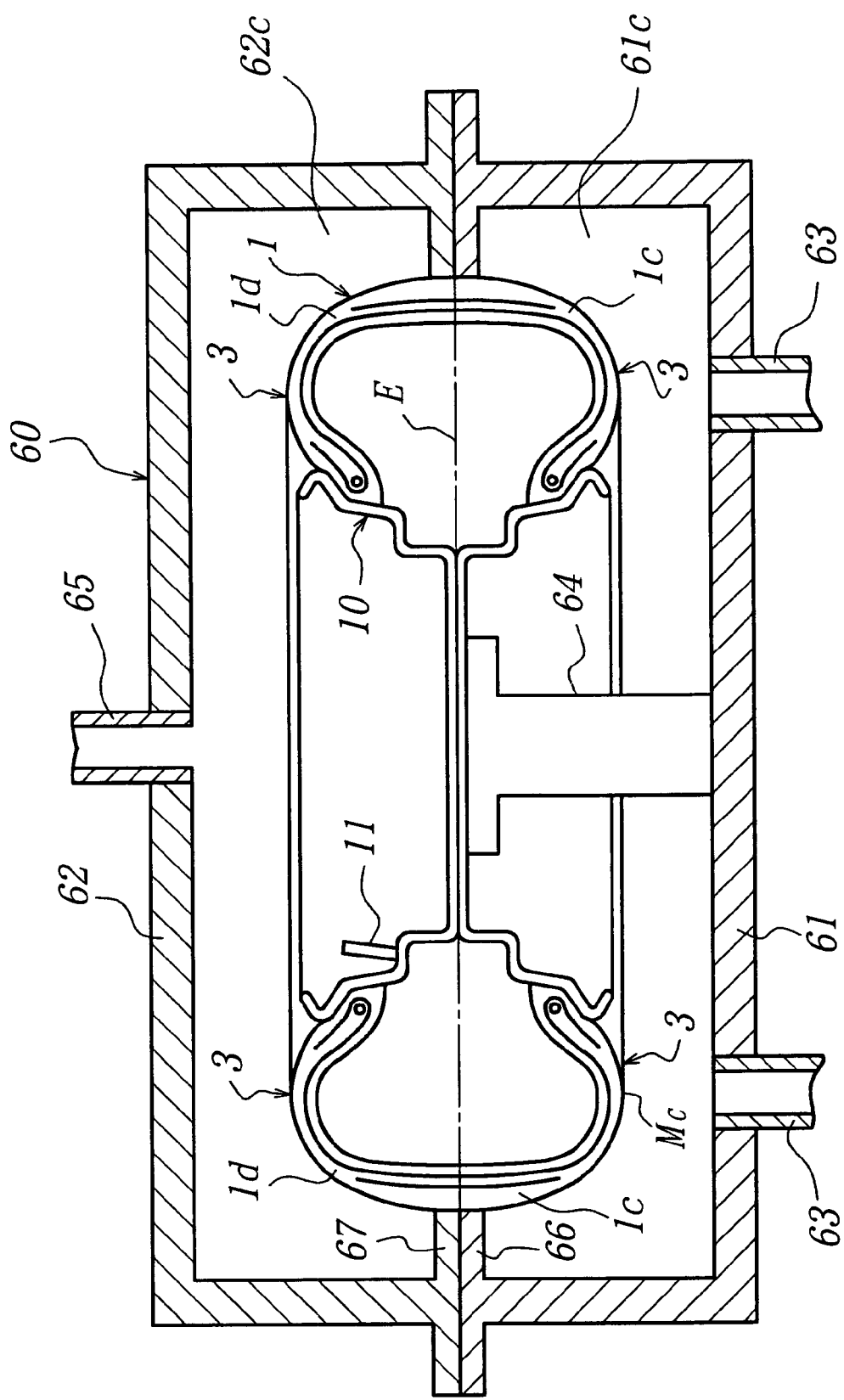
FIG. 10 is a diagrammatically section view-of an apparatus for heating and cooling a tire.

The third distinguishing mark $M_C$ is put on a position of the first half tire part 1c easily visible from an exterior such as a surface of one sidewall portion 3 or the like (see FIG. 10). After the whole of the tire 1 putted with the third distinguishing mark $M_C$ is uniformly heated, the first and second half tire parts of the tire 1 at the finish of the heating are subjected to different thermal hysteresis as mentioned below and particularly cooled under different conditions.

That is, the first half tire part 1c having the mark $M_C$ is cooled at a temperature lower than that of the second half tire part 1d in at least an initial stage in the cooling period of the tire 1. In addition, a given internal pressure, generally an internal pressure of 100–500 kPa is applied to the tire 1 in a period ranging from a middle stage to a last stage of the cooling in the thermal hysteresis. In case of the tire 1 for passenger car, an internal pressure of 100–300 kPa is applied.

By the difference of the above cooling conditions, the modulus of elasticity in the organic fiber cords of the carcass plies 6-1, 6-2 located in the first half part 1c is more decreased as compared with the modulus of elasticity in the organic fiber cords of the plies 6-1, 6-2 located in the second half tire part 1d. This means that the elongation of the organic fiber cord becomes larger under an action of the same tension.

When a given internal pressure is applied to the tire 1, the first half tire part 1c containing the organic fiber cords of a lower modulus of elasticity indicates to have a tendency that it is more elongated in the radial direction of the tire as compared with the second half tire part 1d. As a result, the value of COF is largely decreased to attain the modification of COF.

Then, details of the process for modifying COF will be explained with reference to FIG. 10.

FIG. 10 is a diagrammatically section view of an outline of an apparatus for heating and cooling the tire at a plane including a rotating axial line of the tire.

In FIG. 10, the heating and cooling apparatus comprises a box 60 for heating and cooling the tire. The box 60 is composed of two-split box segments 61 and 62.

The box segment 61 comprises one or more pipes 63 (two pipes in the illustrated embodiment) for supplying a high-temperature gas and a cooling gas and a support 64 supporting the tire 1 and the wheel 10. The other box segment 62 comprises one or more pipes 65 (one pipe in the illustrated embodiment) for supplying the high-temperature gas.

The tire 1 is housed in the box 60 so as to locate the first half tire part 1c putted with the mark $M_C$ on the side of the box segment 61. At least one box segment of the box segments 51, 62 is provided with a partition wall, and in the illustrated embodiment, partition walls 66, 67 are provided on both the box segments 61, 62 to thereby divide the inside space of the box 60 into two internal chambers 61c and 62c at a state of housing the tire 1.

To each of the internal chambers 61c,62c is supplied a heating gas of no lower than 120° C. such as a steam or the like through the pipes 63 and 65 to heat the tire 1 for a given time until it becomes the same as the heating gas temperature. In this case, it is effective to supply the same heating gas into the inside of the tire 1 through a valve 11 for shortening the heating time. However, the heating gas inside the tire 1 is circulated so as not to apply a higher pressure to the tire 1. That is, the internal pressure of the tire 1 during the heating is either an atmospheric pressure communicating to air or substantially a weak pressure. Moreover, the heating of the tire 1 can be carried out at another place and the tire 1 at the finish of the heating can be housed only in the box segment 61 without using the box segment 62.

After the finish of heating the tire 1, the heating gas for the internal chambers 61c, 62c is discharged together with the heating gas for the inside of the tire 1. After the finish of the discharge, a cooling gas of not higher than 10° C., for example, a cooling air is supplied to only the internal chamber 61c through the pipe 63 and desirably circulated therein. On the other hand, the internal chamber 62c is communicated to air. Thus, the first half tire part 1c putted with the third distinguishing mark $M_C$ is cooled at a cooling rate faster than that of the second half tire part 1d. The cooling through the cooling gas corresponds to so-called force-cooling.

In the cooling ranging from the initial stage through the middle stage to the last stage, an atmospheric pressure or a weak pressure is applied to the tire 1 without applying the given internal pressure on the way of the cooling ranging from initial stage to the middle stage. The cooling period (time) at the atmospheric pressure or weak pressure becomes longer as the is COF value is large and shorter as the COF value is small, whereby the control corresponding to the COF value is conducted. Since the internal pressure of the tire 1 is an atmospheric pressure or a weak pressure on the way of the cooling, tension is not applied to the carcass 6 and hence the progress of filament crystallinity and the degree of amorphous molecule orientation in the organic fiber cords of the carcass plies 6-1, 6-2 at the first half tire part 1c becomes slower than that at the second half tire part 1d.

The given internal pressure is applied to the tire 1 during the cooling period from the middle stage to the last stage, whereby tension is applied to the carcass 6 of the tire 1. Since the cords of the plies 6-1, 6-2 bear a greater part of tension, the cords of the plies 6-1, 6-2 at the second half tire part 1d have the same modulus of elasticity as at the finish of PCI, while the cords of the plies 6-1, 6-2 at the first half tire part 1c have the modulus of elasticity smaller than that at the finish of PCI. As a result, when the given internal pressure is applied to the tire 1, the first half tire part 1c has a radius in the radial direction larger than that of the original first half tire part, so that COF is decreased.

Figure 14:
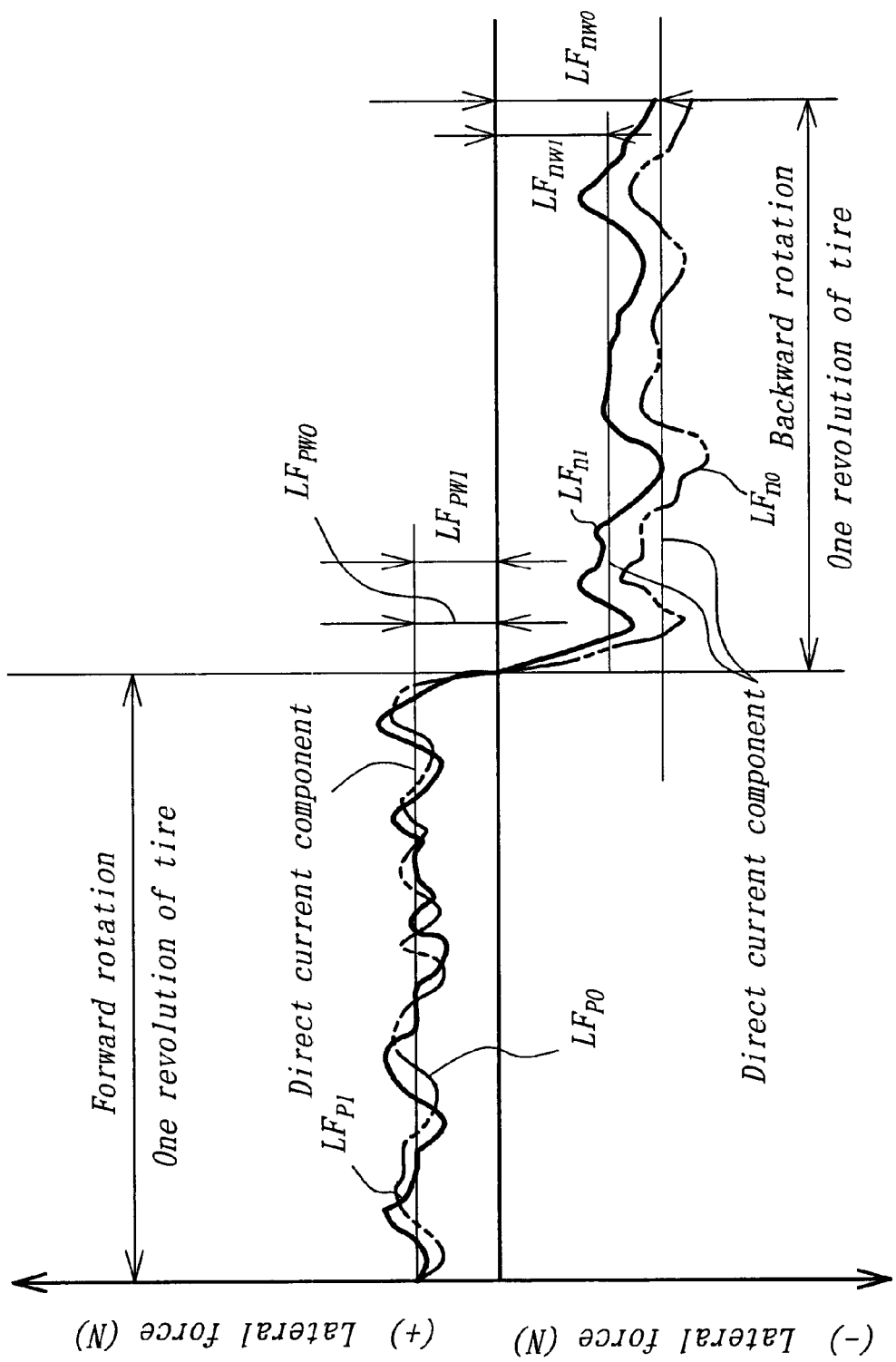
FIG. 14 is a diagram of lateral force in forward and backward rotations of a tire by applying a process for modifying COF according to the invention.
Figure 15:
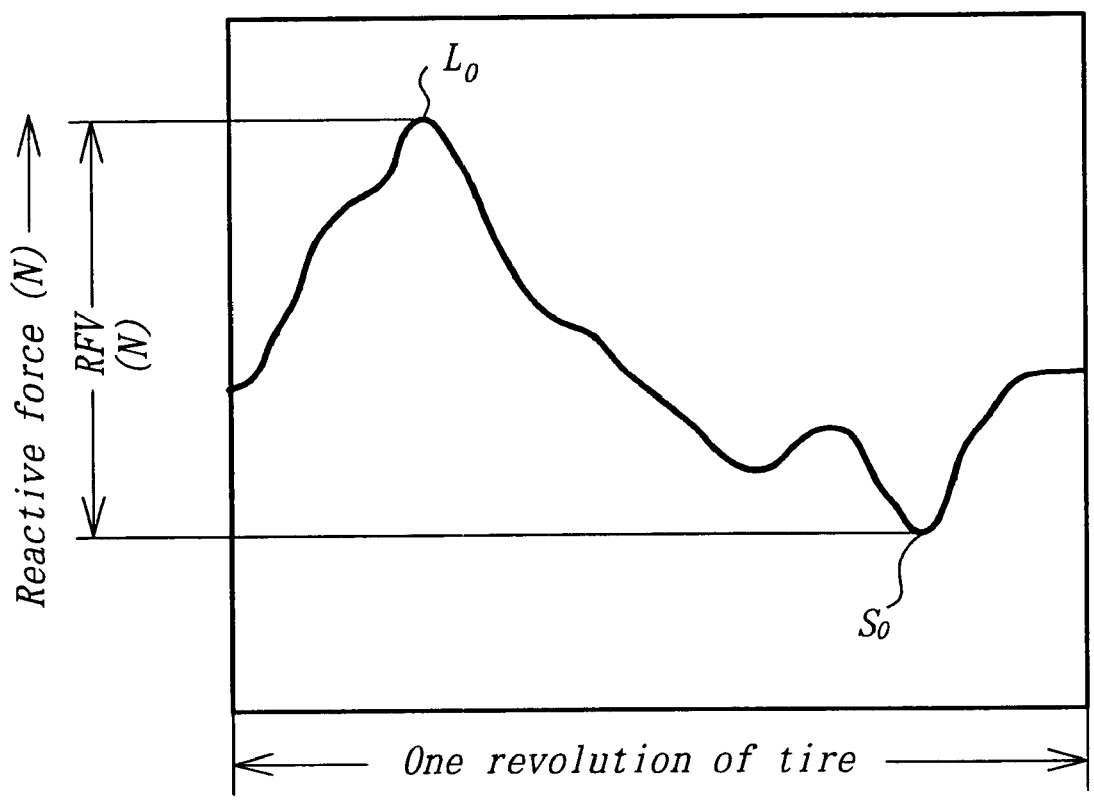
FIG. 15 is a diagram of RFV before modifying.
Figure 16:
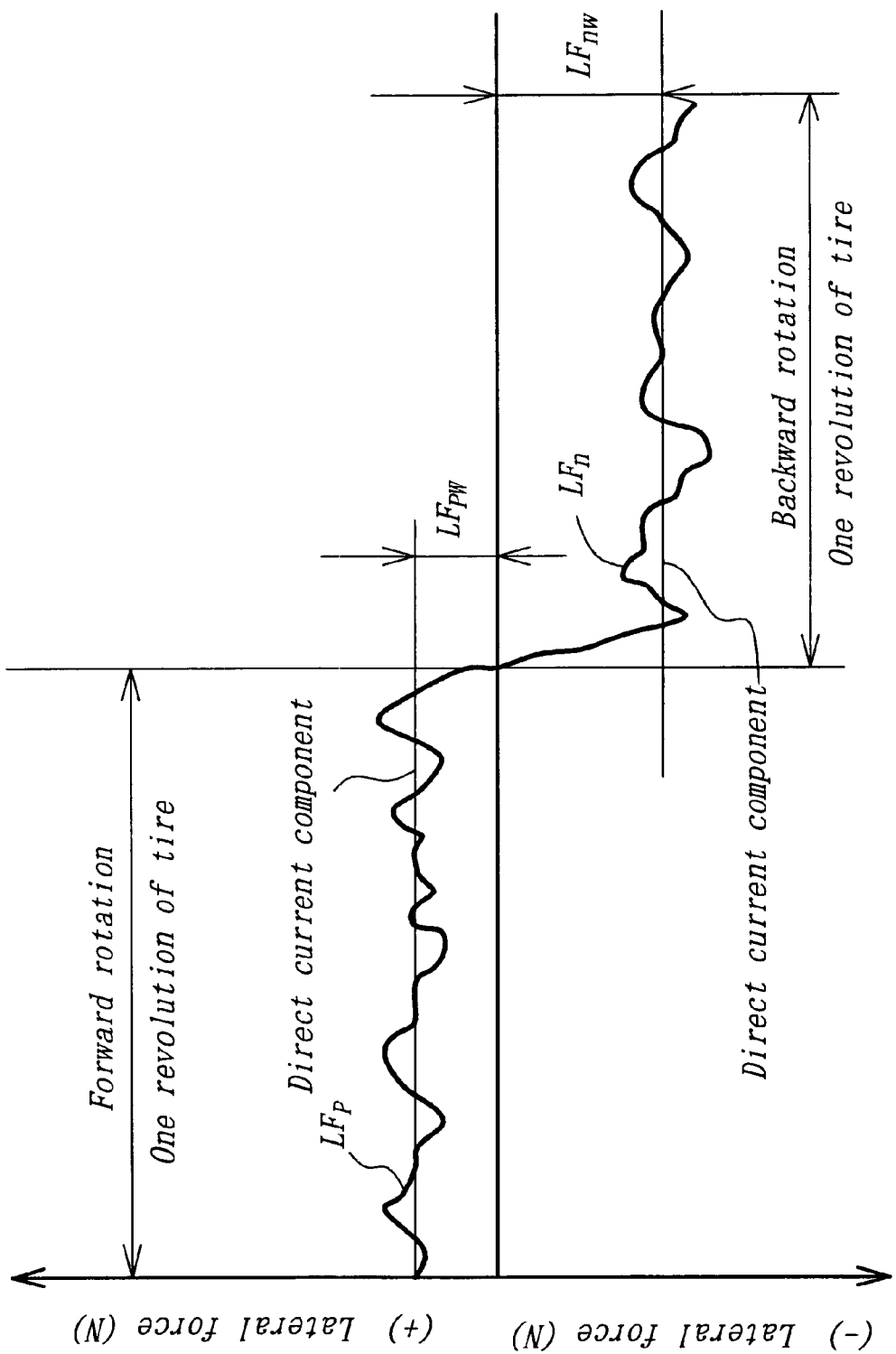
FIG. 16 is a diagram of lateral force in forward and backward rotations of a tire before modifying.

In FIG. 14 are shown lateral forces $LF_{P1}$, $LF_{n1}$ of the tire 1 after the COF modification and direct current components $LF_{PW1}$, $LF_{nW}$, thereof. The lateral forces $LF_{P0}$ and $LF_{p1}$ in a forward rotating region of the tire 1 are substantially unchangeable before and after the modification, while the lateral force $LF_{n1}$ in a backward rotating region of the tire 1 largely changes from $LF_{n0}$ shown by a phantom line before the modification. As seen from FIG. 14, an absolute value of $LF_{nW1}$ is largely decreased as compared with an absolute value of $LF_{nW0}$, so that $COF_1=(LF_{PW1}+L_{nW1})/2$ after the modification becomes considerably smaller than $COF_0=(LF_{PW0}+LF_{nW0})/2$ before the modification.

For example, in the radial tire for passenger car having a tire size of 185/50R14, it is confirmed that the value of COF is decreased to about ¼.

Thus, in the tire 1 subjected to the COF modification, the organic fiber cords at the first half tire part 1c have a modulus of elasticity smaller than that of the organic fiber cords at the second half tire part 1d.

In brief, it is possible to conduct sufficient RFV modification and COF modification by dividing the tire 1 to be modified into different portions and applying different thermal hysteresis to these portions. Therefore, the tire 1 after the modification holds an excellent appearance and is not accompanied with a risk such as breakage or the like because it is not required to apply a considerably high air pressure to the tire 1.

Moreover, the invention aims at a point that a difference of modulus of elasticity is provided to the organic fiber cords of the carcass plies 6-1, 6-2, so that such a difference of the modulus of elasticity in the organic fiber cords is a significant of at least 5% in a significant examination using a statistical method.

According to the first aspect of the invention, there can be provided a process for modifying a uniformity of the tire which can maintain an excellent environment having no dust such as buffed dust or the like without causing a fear of tire breakage and can surely and effectively keep RFV within a given rated value range by dividing a RFV-rejected tire into two different tire portions and applying different thermal hysteresis to these portions.

According to the second aspect of the invention, there can be provided a process for modifying a uniformity of the tire which can maintain an excellent environment without causing a fear of tire breakage and can surely and effectively keep COF within a given rated value range by dividing a COF-rejected tire into two different half tire parts and applying different thermal hysteresis to these parts.

According to the third aspect or fourth aspect of the invention, there can be provided tires capable of forwarding as an acceptable tire while holding an excellent appearance through vulcanization and building-up steps by applying the process described in the first or second aspect of the invention to the RFV-rejected tire or COF-rejected tire.

What is claimed is:

1. A process for modifying a uniformity of a tire comprising a carcass ply of rubberized organic fiber cords arranged side by side in a radial direction of the tire, which comprises the steps of measuring a radial force variation (RFV) of the tire inflated under a given internal pressure, putting a first distinguishing mark to a first tire portion indicating a minimum value of RFV, putting a second distinguishing mark to a second tire portion indicating a maximum value of RFV, applying different relative thermal treatment to the first tire portion and the second tire portion, and keeping a state of applying the given internal pressure to the tire during cooling in the thermal treatment, wherein at least a sidewall portion of the first tire portion is heated to make a temperature thereof higher than that of the second tire portion at the finish of the heating of the first tire portion in the thermal treatment.

2. The process according to claim 1, wherein a waveform of a primary component is taken out from the measured RFV waveform and the first distinguishing mark is put to the first tire portion corresponding to a maximum value of the primary component waveform, and the second distinguishing mark is put to the second tire portion corresponding to a minimum value thereof.

3. The process according to claim 1, wherein the internal pressure of the tire during the heating in the thermal treatment is either an atmospheric pressure or a low pressure of not more than 150 kPa.

4. The process according to claim 1, wherein only at least the sidewall portion of the first tire portion is partially heated at a given temperature.

5. The process according to claim 1, wherein at least sidewall portions of the first tire portion and the second tire portion are heated, and at different amounts of heat, respectively.

6. The process according to claim 1, wherein the heating is carried out so as to make an internal temperature of at least the sidewall portion of the first tire portion higher by no less than 40° C. than that of at least a sidewall portion of the second tire portion at the finish of the heating of the first tire portion of the tire.

7. The process according to claim 1, wherein the whole of the tire is subjected to the heat and is spontaneously cooled.

8. The process according to claim 1, wherein at least the sidewall portion of the first tire portion is slowly cooled at a cooling rate slower than that of at least a sidewall portion of the second tire portion.

9. A process for modifying a uniformity of a tire comprising a carcass ply of rubberized organic fiber cords arranged side by side in a radial direction of the tire, which comprises the steps of measuring a radial force variation (RFV) of the tire inflated under a given internal pressure, putting a first distinguishing mark to a first tire portion indicating a minimum value of RFV, putting a second distinguishing mark to a second tire portion indicating a maximum value of RFV, applying different relative thermal treatment to the first tire portion and the second tire portion, and keeping a state of applying the given internal pressure to the tire during cooling in the thermal treatment, wherein the whole of the tire is uniformly heated at the same temperature and at least a sidewall portion of the second tire portion in the tire after the finish of the heating is cooled at a cooling rate faster than that of at least a sidewall portion of the first tire portion.

10. The process according to claim 9, wherein at least the sidewall portion of the second tire portion is quenched by force-cooling and at least the sidewall portion of the first tire portion is slowly cooled by spontaneous cooling.

11. The process according to claim 9, wherein a waveform of a primary component is taken out from the measured RFV waveform and the first distinguishing mark is put to the first tire portion corresponding to a maximum value of the primary component waveform, and the second distinguishing mark is put to the second tire portion corresponding to a minimum value thereof.

12. The process according to claim 9, wherein the internal pressure of the tire during the heating in the thermal treatment is either an atmospheric pressure or a low pressure of not more than 150 kPa.

13. The process according to claim 1, wherein at least a sidewall portion of the second tire portion is quenched by force-cooling and at least the sidewall portion of the first tire portion is slowly cooled by spontaneous cooling.

14. The process according to claim 9, wherein the whole of the tire is subjected to the heat and is spontaneously cooled.

15. The process according to claim 9, wherein at least the sidewall portion of the first tire portion is slowly cooled at a cooling rate slower than that of at least the sidewall portion of the second tire portion.

* * * * *